United States Patent
Chun et al.

(10) Patent No.: US 11,922,600 B2
(45) Date of Patent: Mar. 5, 2024

(54) AFTERIMAGE COMPENSATOR, DISPLAY DEVICE HAVING THE SAME, AND METHOD FOR DRIVING DISPLAY DEVICE

(71) Applicant: Samsung Display Co., Ltd., Yongin-si (KR)

(72) Inventors: Byung Ki Chun, Yongin-si (KR); Young Wook Yoo, Yongin-si (KR); Jun Gyu Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 287 days.

(21) Appl. No.: 16/504,752

(22) Filed: Jul. 8, 2019

(65) Prior Publication Data
US 2020/0074596 A1 Mar. 5, 2020

(30) Foreign Application Priority Data
Aug. 31, 2018 (KR) .................. 10-2018-0103958

(51) Int. Cl.
*G06T 15/00* (2011.01)
*G06T 5/00* (2006.01)
*G09G 5/10* (2006.01)

(52) U.S. Cl.
CPC ............... *G06T 5/002* (2013.01); *G09G 5/10* (2013.01); *G09G 2320/0257* (2013.01); *G09G 2320/0626* (2013.01)

(58) Field of Classification Search
CPC ....... G09G 2320/0257; G09G 2360/16; G09G 3/20; G09G 3/3208; G09G 5/10;
(Continued)

(56) References Cited

U.S. PATENT DOCUMENTS

| 4,908,780 A | * | 3/1990 | Priem | ................. G09G 5/393 345/611 |
| 5,600,763 A | * | 2/1997 | Greene | ................. G06T 15/06 345/420 |

(Continued)

FOREIGN PATENT DOCUMENTS

| CN | 103839509 A | 6/2014 |
| CN | 105392055 A | 3/2016 |

(Continued)

OTHER PUBLICATIONS

Brandes TS, Naskrecki P, Figueroa HK. Using image processing to detect and classify narrow-band cricket and frog calls. The Journal of the Acoustical Society of America. Nov. 2006;120(5):2950-7.*

(Continued)

*Primary Examiner* — Phu K Nguyen
(74) *Attorney, Agent, or Firm* — Lewis Roca Rothgerber Christie LLP

(57) ABSTRACT

An afterimage compensator includes: a logo detector configured to detect a logo area including a logo image displayed in a display panel and a logo background image included in a preset range at the periphery of the logo image, based on input image data; a blurring determiner configured to determine a blurring area corresponding to the logo image, using the logo image and the logo background image; and an image corrector configured to blur the logo image, based on the blurring area.

12 Claims, 8 Drawing Sheets

IDATA

DATA COMPENSATION

CDATA

(58) Field of Classification Search
CPC ............... G09G 3/2007; G09G 3/2051; G09G 2320/046; G09G 3/36; G09G 2320/0626; G06K 9/325; G06K 9/3266; G06K 2209/25; G06T 5/002
USPC .......................................................... 345/418
See application file for complete search history.

(56) References Cited

U.S. PATENT DOCUMENTS

| | | | | |
|---|---|---|---|---|
| 5,940,080 | A * | 8/1999 | Ruehle | G09G 5/28 345/611 |
| 6,606,420 | B1 * | 8/2003 | Loce | G06T 5/30 382/199 |
| 6,608,942 | B1 * | 8/2003 | Le | G06T 5/30 382/279 |
| 6,982,723 | B1 * | 1/2006 | Szymaniak | G06T 15/40 345/611 |
| 7,031,518 | B2 * | 4/2006 | Curry | G06K 9/00456 382/164 |
| 7,061,507 | B1 * | 6/2006 | Tuomi | G06T 11/40 345/611 |
| 7,280,120 | B2 * | 10/2007 | Ecob | G06T 15/503 345/422 |
| 7,355,757 | B2 * | 4/2008 | Bhattacharjya | G06K 15/1223 345/611 |
| 7,518,618 | B2 * | 4/2009 | Loce | G06T 11/203 345/596 |
| 8,264,547 | B1 * | 9/2012 | Sayre | H04N 9/69 348/189 |
| 8,294,730 | B2 * | 10/2012 | Tremblay | G06T 15/503 345/611 |
| 8,885,941 | B2 * | 11/2014 | Schiller | G06T 5/003 382/180 |
| 9,406,168 | B1 * | 8/2016 | Baldwin | G06T 7/90 |
| 9,418,591 | B2 * | 8/2016 | Kim | G09G 3/3225 |
| 9,613,591 | B2 | 4/2017 | Ryu | |
| 9,666,116 | B2 * | 5/2017 | Jung | G09G 3/2003 |
| 9,691,353 | B2 | 6/2017 | Joo et al. | |
| 9,812,067 | B2 | 11/2017 | Yang et al. | |
| 10,013,920 | B2 | 7/2018 | Oh et al. | |
| 10,217,195 | B1 * | 2/2019 | Agrawal | G06T 7/11 |
| 10,354,575 | B2 | 7/2019 | Yang et al. | |
| 10,482,577 | B2 * | 11/2019 | Beri | G06T 11/40 |
| 10,992,845 | B1 * | 4/2021 | Seely | H04N 5/2226 |
| 2004/0125103 | A1 * | 7/2004 | Kaufman | G06T 15/40 345/419 |
| 2007/0206008 | A1 * | 9/2007 | Kaufman | G06T 15/40 345/424 |
| 2014/0146071 | A1 | 5/2014 | Kim et al. | |
| 2014/0307964 | A1 | 10/2014 | Kim et al. | |
| 2015/0062197 | A1 | 3/2015 | Jung et al. | |
| 2017/0201793 | A1 | 7/2017 | Pereira et al. | |
| 2018/0082152 | A1 | 3/2018 | Katz et al. | |
| 2018/0182288 | A1 * | 6/2018 | Kim | G09G 3/3225 |
| 2020/0074708 | A1 * | 3/2020 | Park | G09G 3/3233 |

FOREIGN PATENT DOCUMENTS

| | | |
|---|---|---|
| CN | 105702212 A | 6/2016 |
| CN | 106599892 A | 4/2017 |
| CN | 107452327 A | 12/2017 |
| CN | 107871475 A | 4/2018 |
| KR | 10-2014-0070792 A | 6/2014 |
| KR | 10-2014-0122605 A | 10/2014 |
| KR | 10-2015-0057026 A | 5/2015 |
| KR | 10-2016-0056708 A | 5/2016 |
| KR | 10-2016-0071886 A | 6/2016 |
| KR | 10-2017-0037783 A | 4/2017 |
| KR | 10-2017-0038293 A | 4/2017 |
| KR | 10-2017-0049241 A | 5/2017 |
| KR | 10-2017-0080161 A | 7/2017 |
| KR | 10-2020-0026424 A | 3/2020 |
| KR | 10-2290687 B1 | 8/2021 |
| KR | 10-2416694 B1 | 7/2022 |

OTHER PUBLICATIONS

Shafait, F., Keysers, D. and Breuel, T.M., Jan. 2008, Efficient implementation of local adaptive thresholding techniques using integral images. In Document recognition and retrieval XV (vol. 6815, p. 681510). International Society for Optics and Photonics.*
Kundu A, Mitra S, Vaidyanathan P. Application of two-dimensional generalized mean filtering for removal of impulse noises from images. IEEE transactions on acoustics, speech, and signal processing. Jun. 1984;32(3):600-9.*
EPO Extended Search Report dated Jan. 8, 2020, for corresponding European Patent Application No. 19194774.6 (11 pages).

* cited by examiner

BTH = 0

FIG. 8B

| PBV | 2/9 | 4/9 | 6/9 | 4/9 | 2/9 | 0 | 0 | 0 |
|---|---|---|---|---|---|---|---|---|
| | 3/9 | 6/9 | 1 | 6/9 | 3/9 | 0 | 0 | 0 |
| | 3/9 | 6/9 | 1 | 7/9 | 5/9 | 3/9 | 3/9 | 2/9 |
| | 3/9 | 6/9 | 1 | 8/9 | 7/9 | 6/9 | 6/9 | 4/9 |
| | 2/9 | 4/9 | 6/9 | 6/9 | 6/9 | 6/9 | 6/9 | 4/9 |
| | 1/9 | 2/9 | 3/9 | 3/9 | 3/9 | 3/9 | 3/9 | 3/9 |

BTH = 2/9

FIG. 8C

| PBV | 2/9 | 4/9 | 6/9 | 4/9 | 2/9 | 0 | 0 | 0 |
|---|---|---|---|---|---|---|---|---|
| | 3/9 | 6/9 | 1 | 6/9 | 3/9 | 0 | 0 | 0 |
| | 3/9 | 6/9 | 1 | 7/9 | 5/9 | 3/9 | 3/9 | 2/9 |
| | 3/9 | 6/9 | 1 | 8/9 | 7/9 | 6/9 | 6/9 | 4/9 |
| | 2/9 | 4/9 | 6/9 | 6/9 | 6/9 | 6/9 | 6/9 | 4/9 |
| | 1/9 | 2/9 | 3/9 | 3/9 | 3/9 | 3/9 | 3/9 | 3/9 |

BTH = 3/9

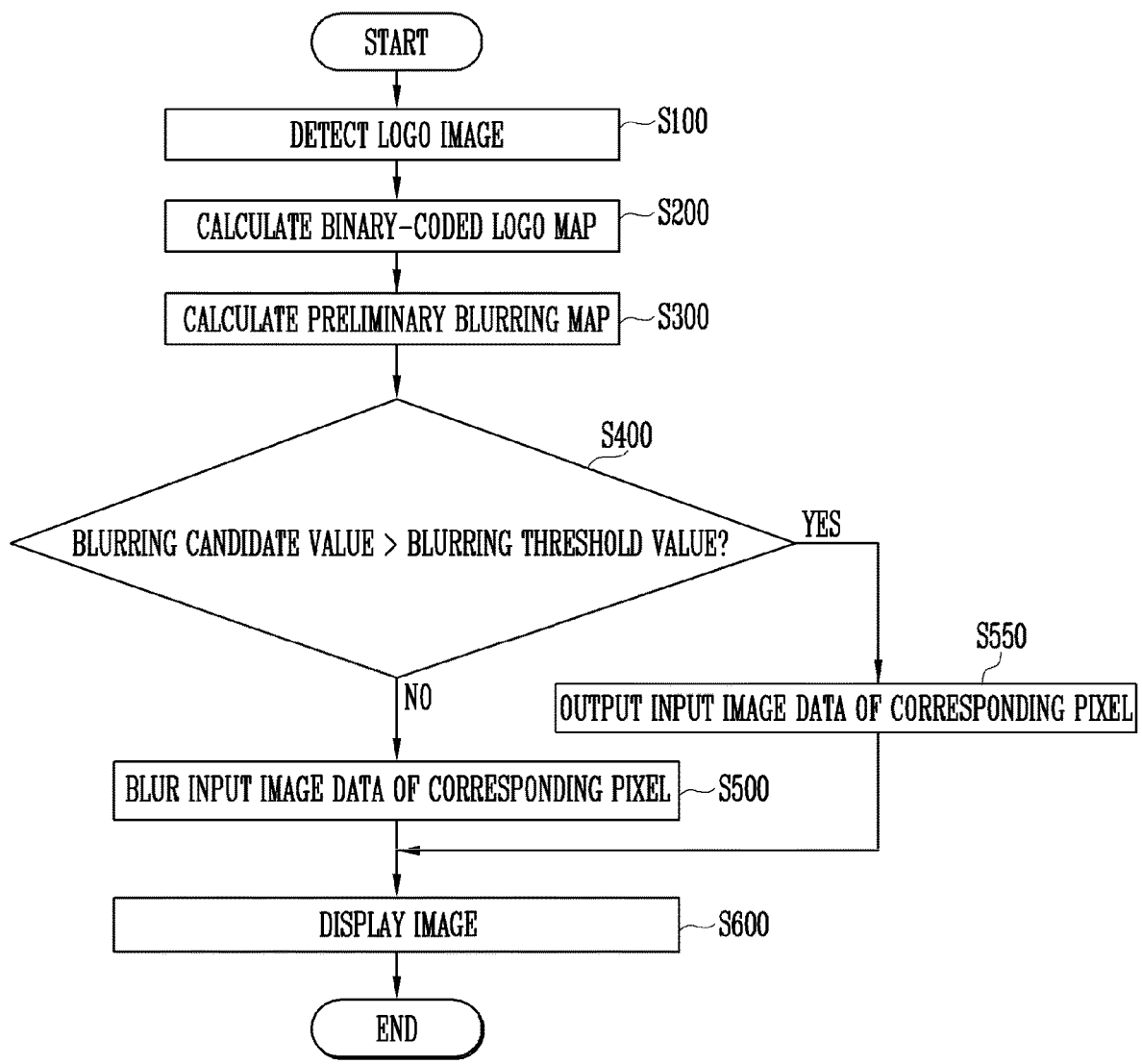

AFTERIMAGE COMPENSATOR, DISPLAY DEVICE HAVING THE SAME, AND METHOD FOR DRIVING DISPLAY DEVICE

CROSS-REFERENCE TO RELATED APPLICATION

The present application claims priority to and the benefit of Korean patent application 10-2018-0103958 filed on Aug. 31, 2018 in the Korean Intellectual Property Office, the entire disclosure of which is incorporated herein by reference.

BACKGROUND

1. Technical Field

Aspects of some example embodiments of the present disclosure generally relate to a display device, a display device having an afterimage compensator, and a method for driving a display device.

2. Description of the Related Art

In a display device such as an organic light emitting display (OLED) device, a liquid crystal display (LCD) device, or a plasma display device, a pixel may become degraded as driving time elapses, and therefore, an afterimage may occur. For example, when a logo, subtitle or the like, is displayed with high luminance, or is continuously displayed for a long time in a specific area of a display screen, degradation of the corresponding pixels may be accelerated, and therefore, an afterimage may occur.

In an effort to avoid accelerated degradation of pixels, a technique for moving and displaying an image on a display panel in a certain period may be utilized.

The Background section of the present Specification includes information that is intended to provide context to example embodiments, and the information in the present Background section does not necessarily constitute prior art.

SUMMARY

Aspects of some example embodiments may include an afterimage compensator for correcting input image data to blur a logo image.

Aspects of some example embodiments may also include a display device having the afterimage compensator.

Aspects of some example embodiments may also include a method for driving a display device for displaying a blurred logo image.

According to some example embodiments of the present disclosure, there is provided an afterimage compensator including: a logo detector configured to detect a logo area including a logo image displayed in a display panel and a logo background image included in a preset range at the periphery of the logo image, based on input image data; a blurring determiner configured to determine a blurring area corresponding to the logo image, using the logo image and the logo background image; and an image corrector configured to blur the logo image, based on the blurring area.

The blurring area may include the logo image and a portion of the logo background image adjacent to the logo image.

Luminance may be gradually decreased when approaching the outside of the blurring area.

The position of the blurring area may be equal to that of the logo image.

The blurring determiner may include: a logo map calculator configured to calculate a binary-coded logo map that distinguishes the logo image and the logo background image; a preliminary corrector configured to calculate a preliminary blurring map having blurring candidate values by averaging binary data of pixels included in the logo map; and a blurring area determiner configured to determine a blurring area of the logo image by comparing each of the blurring candidate values included in the preliminary blurring map and a preset blurring threshold value.

The preliminary corrector may acquire a blurring candidate value of a target pixel by calculating an average of the binary data of the target pixel and the binary data of preset peripheral pixels of the target pixel.

A preset weighted value may be applied to the binary data or the blurring candidate value.

The size of the blurring area including the logo image may be changed depending on the blurring threshold value.

When the blurring candidate value of a target pixel exceeds the blurring threshold value, the blurring area determiner may determine the target pixel as the blurring area.

The image corrector may blur the input image data of pixels corresponding to the blurring area.

The image corrector may acquire averaged image data of a target pixel as blurring image data by calculating an average of the input image data of the target pixel and the input image data of preset peripheral pixels of the target pixel.

The image corrector may include: a blurring data calculator configured to convert the input image data of the logo area respectively into blurring image data; and a data selector configured to select the blurring image data with respect to a pixel included in the blurring area, and select the input image data with respect to a pixel included in an area except the blurring area.

The logo detector may include an artificial intelligence program that performs machine learning for detecting the logo image.

According to some example embodiments of the present disclosure, there is provided a display device including: a display panel including a plurality of pixels, the display panel displaying an image; an afterimage compensator configured to detect a logo image and generate blurring image data for blurring the logo image; a scan driver configured to provide a scan signal to the display panel; and a data driver configured to provide the display panel with a data signal corresponding to the blurring image data and input image data, wherein the afterimage compensator includes: a logo detector configured to detect a logo area including the logo image and a logo background image included in a preset range at the periphery of the logo image, based on the input image data; a blurring determiner configured to determine a blurring area corresponding to the logo image, using the logo image and the logo background image; and an image corrector configured to correct the input image data corresponding to the blurring area as the blurring image data.

The blurring area may include the logo image and a portion of the logo background image adjacent to the logo image.

Luminance may be gradually decreased when approaching the outside of the blurring area.

The position of the blurring area may be equal to that of the logo image.

The logo background image may not be blurred, and only the logo image may be blurred.

According to some example embodiments of the present disclosure, there is provided a method for driving a display device, the method including: detecting a logo area including a logo image displayed in a display panel and a logo background image included in a preset range at the periphery of the logo image, based on input image data; calculating a binary-coded logo map that distinguishes the logo image and the logo background image; calculating a preliminary blurring map having blurring candidate values by averaging binary data of pixels included in the logo map; determining a blurring area of the logo image by comparing each of the blurring candidate values included in the preliminary blurring map and a preset blurring threshold value; and blurring the input image data of pixels corresponding to the blurring area.

When the blurring candidate value of a target pixel exceeds the blurring threshold value, the target pixel may be determined as the blurring area in the determining of the blurring area of the logo image.

As described above, in the afterimage compensator, the display device having the same, and the method for driving the display device according to the present disclosure, image blurring may be performed in only the blurring area within the logo area. Accordingly, although the logo image is blurred, the logo background image at the periphery of the logo image can be relatively clearly displayed without loss of the luminance and grayscale of an original image. Thus, any change such as image distortion caused by blurring may not be recognized or perceived by a user, and degradation of pixels that display the logo image and occurrence of an afterimage may be reduced or minimized.

BRIEF DESCRIPTION OF THE DRAWINGS

Aspects of some example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 11 is a flowchart illustrating a method for driving the display device according to some example embodiments of the present disclosure.

DETAILED DESCRIPTION

Figure 1:
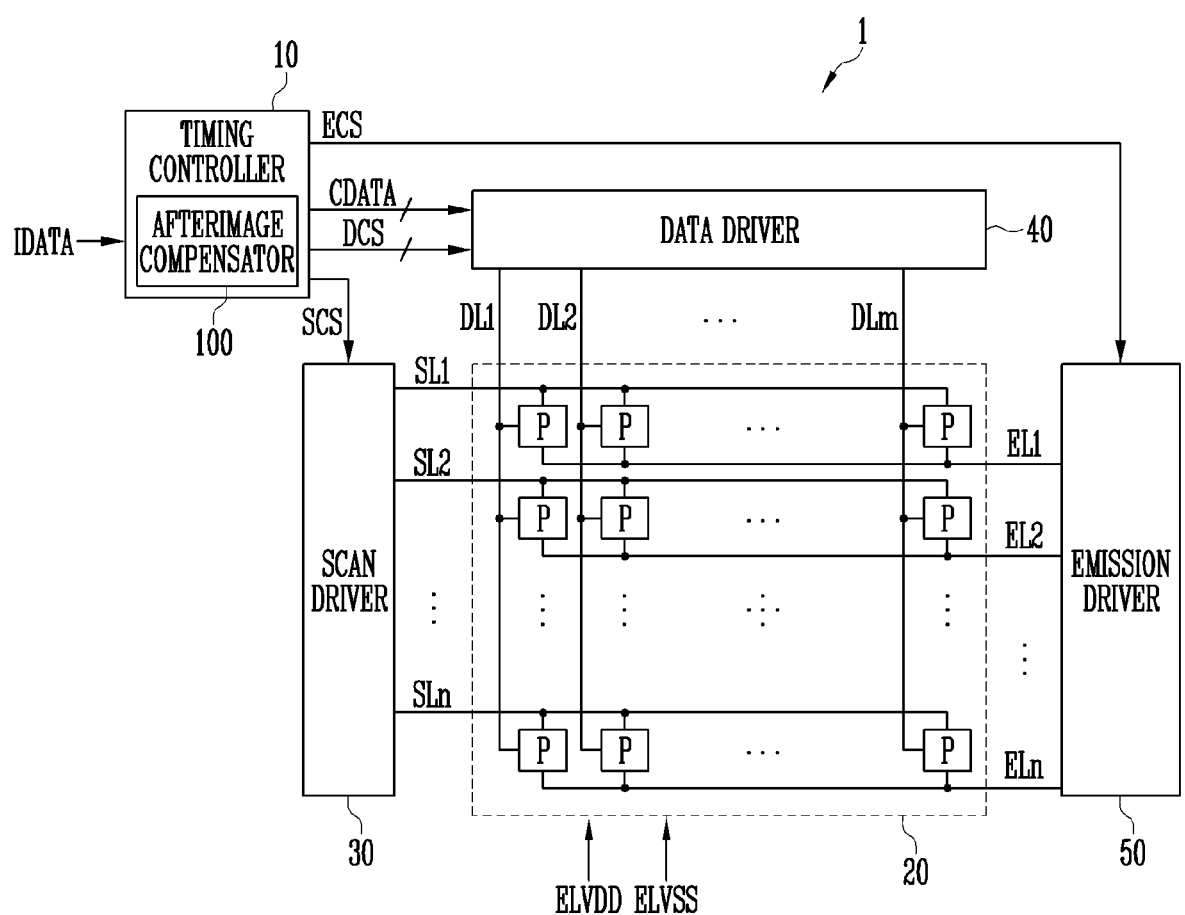
FIG. 1 is a block diagram illustrating a display device according to some example embodiments of the present disclosure.

Hereinafter, aspects of some example embodiments of the present disclosure will be described in more detail with reference to the accompanying drawings. Throughout the drawings, the same reference numerals are given to the same elements, and their overlapping descriptions will be omitted.

FIG. 1 is a block diagram illustrating a display device according to some example embodiments of the present disclosure.

Referring to FIG. 1, the display device 1 may include a timing controller 10, a display panel 20, a scan driver 30, a data driver 40, an emission driver 50, and an afterimage compensator 100.

According to some example embodiments, at least some components of the afterimage compensator 100 may be included in the timing controller 10 and/or the data driver 40.

In some example embodiments, the display device 1 may be implemented as an organic light emitting display device including a plurality of organic light emitting devices. However, this is merely illustrative, and the display device 1 may be implemented as a liquid crystal display device, a plasma display device, a quantum dot display device, or the like.

The display panel 20 may include a plurality of pixels P. The display panel 20 may be connected to the scan driver 30 through a plurality of scan lines SL1 to SLn, be connected to the emission driver 50 through a plurality of emission control lines EL1 to ELn, and be connected to the data driver 40 through a plurality of data lines DL1 to DLm. The display panel 20 may include m (m is a positive integer) pixel columns respectively connected to the data lines DL1 to DLm and n (n is a positive integer) pixel rows respectively connected to the scan lines SL1 to SLn and the emission control lines EL1 to ELn. The display panel 20 may display a shifted image, based on input image data IDATA received from the outside and/or image data CDATA compensated by the afterimage compensator 100.

The display panel 20 may display a main image including actual image information and a logo image that is a still image. The logo image may be an image displayed with a high luminance (high grayscale) at a fixed position for a certain time or more. For example, the logo image may include a logo of a broadcasting company, a subtitle, a data, a time, etc. In this specification, various kinds of images displayed with a high luminance (high grayscale) at a fixed position for a certain time or more are all designated as logo images.

The scan driver 30 may provide a scan signal to the display panel 20 through the plurality of scan lines SL1 to SLn. In an embodiment, each of the scan lines SL1 to SLn may be connected to pixels P located on a corresponding pixel row.

The data driver 40 may provide a data signal to the display panel 20 through the plurality of data lines DL1 to DLm according to the scan signal. In some example embodiments, the data driver 40 may generate a data signal corresponding to the compensated image data CDATA, and provide the data signal to the display panel 20. In some example embodiments, each of the data lines DL1 to DLm may be connected to pixels P located on a corresponding pixel column of the display panel 20.

The emission driver 50 may provide an emission control signal to the display panel 20 through the plurality of emission control lines EU to ELn. In some example embodiments, each of the emission control lines EU to ELn may be connected to pixels located to a corresponding pixel row.

The timing controller 10 may generate a plurality of control signals SCS, DCS, and ECS and provide the generated control signals to the scan driver 30, the data driver 40, and the emission driver 50, to control the scan driver 30, the data driver 40, and the emission driver 50. The timing controller 10 may receive an input control signal and input image data IDATA from an image source such as an external graphic device. The input control signal may include a main clock signal, a vertical synchronization signal, a horizontal synchronization signal, and a data enable signal. The timing controller 10 may generate image data suitable for an operating condition of the display panel 20, based on the input image data IDATA, and provide the generated image data to the data driver 40.

Also, the timing controller 10 may generate a first control signal SCS for controlling a driving timing of the scan driver 30, a second control signal DCS for controlling a driving timing of the data driver 40, and a third control signal ECS for controlling a driving timing of the emission driver 50, based on the input control signal, and provide the generated control signals to the scan driver 30, the data driver 40, and the emission driver 50. In some example embodiments, the afterimage compensator 100 may be included in the timing controller 10. In some example embodiments, the afterimage compensator 100 may be arranged to be connected to the timing controller 10.

A logo image may be displayed in a state in which it is blurred so as to prevent or reduce degradation of the same pixel P and occurrence of an afterimage, which are caused by a still image such as a logo displayed through the pixel for a long time. That is, the logo image may be displayed in a state in which its luminance is decreased.

The afterimage compensator 100 may detect a logo image, based on the input image data IDATA. In an embodiment, the afterimage compensator 100 may generate blurring image data for blurring the logo image.

In an embodiment, the afterimage compensator 100 may include a logo detector for detecting a logo area including a logo image and a logo background image included in a preset range at the periphery of the logo image, based on input image data IDATA, a blurring determiner for determining a blurring area corresponding to the logo image, using the logo image and the logo background image, and an image corrector for correcting input image data IDATA corresponding to the blurring area to blurring image data.

The data driver 40 may output a data signal corresponding to the blurring image data. Accordingly, a blurred logo image may be displayed on a screen. In some example embodiments, the blurring area may include a logo image and a portion of a logo background image adjacent to the logo image. In some example embodiments, luminance may be gradually decreased when approaching the outside of the blurring area.

Accordingly, degradation of the pixel and occurrence of an afterimage, which are caused by the logo image, can be minimized or reduced.

Figure 2:
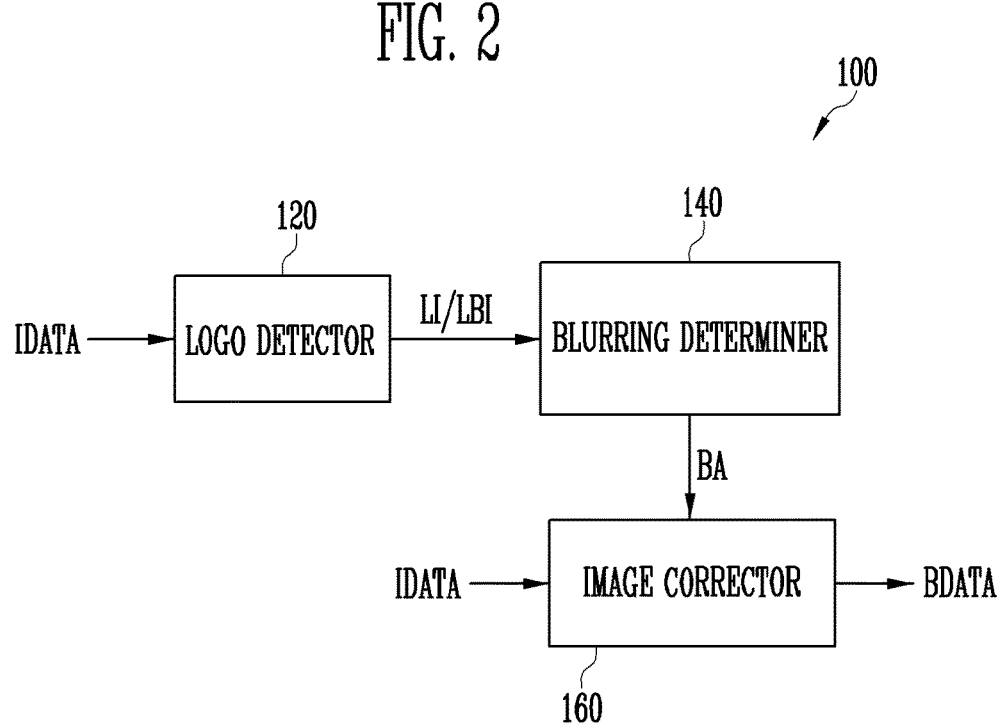
FIG. 2 is a block diagram illustrating an afterimage compensator according to some example embodiments of the present disclosure.
Figure 3:
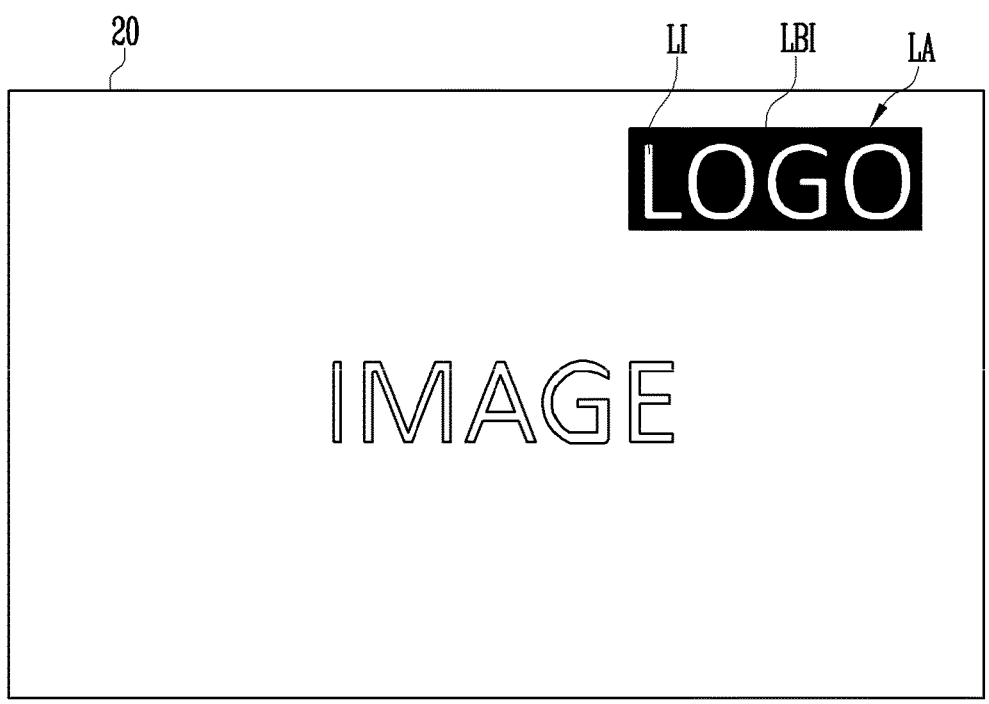
FIG. 3 is a diagram illustrating an example of an image displayed in the display device of FIG. 1.

FIG. 2 is a block diagram illustrating an afterimage compensator according to some example embodiments of the present disclosure. FIG. 3 is a diagram illustrating an example of an image displayed in the display device of FIG. 1.

Referring to FIGS. 1 to 3, the afterimage compensator 100 may include a logo detector 120, a blurring determiner 140, and an image corrector 160.

The logo detector 120 may detect a logo area LA including a logo image LI displayed in the display panel 20 and a logo background image LBI included in a preset range at the periphery of the logo image LI, based on the input image data IDATA.

The logo image LI corresponds to a substantial logo including characters, drawings, and the like. The logo area LA may be an area including all portions determined as the logo image LI. For example, as shown in FIG. 3, the logo area LA may be an arbitrary quadrangular area including the logo image LI. However, this is merely illustrative, and the shape and size of the logo area LA are not limited thereto.

The logo background image LBI may correspond to the other portion obtained by excluding the logo image LI from the logo area LA.

Related art systems may utilize a method for minimizing or reducing a logo afterimage in a manner that predicts a logo area, using accumulation of image data, and decreases the luminance of the entire logo area. However, the related art method decreases not only the luminance of the logo image LI but also the luminance of the periphery of the logo image LI. Accordingly, the entire luminance of a display area including the logo image LI is decreased, and therefore, the image quality of the periphery of the logo image LI is deteriorated.

The afterimage compensator 100 according to some example embodiments of the present disclosure blurs the logo image LI and a portion of the logo background image LBI, instead of the entire logo area LA, so that pixel degradation and occurrence of an afterimage, which are caused by the logo, can be minimized or reduced.

In some example embodiments, the logo detector 120 may include an artificial intelligence program that performs machine learning for detecting the logo image LI. In some example embodiments, the logo image LI may be detected using machine learning based on a convolutional neural network, etc.

Accordingly, the detection accuracy of the position and shape of the logo image LI can be considerably improved. When the detection accuracy is improved, logo map calculation and blurring of the logo image can be performed.

In some example embodiments, the logo detector 120 may detect the logo image LI at a preset time interval. Alternatively, the logo detector 120 may detect the logo image LI by analyzing consecutive frames (e.g., predetermined frames) at a specific time. The detection of the logo image LI may be performed using the artificial intelligence program.

A portion of a main image may be overlappingly displayed in the logo area LA. When the entire logo area LA including the logo background image LBI are blurred, the image quality in the logo area LA may be deteriorated. Therefore, the blurring in the main image and the logo background image LBI is to be minimized or reduced. The blurring determiner 140 may determine an area in which an image is blurred so as to maintain a high-quality image and minimize or reduce a logo afterimage.

The blurring determiner 140 may determine a blurring area BA corresponding to the logo image LI, using the logo image LI and the logo background image LBI. In an embodiment, the blurring area BA may include the logo image LI and a portion of the logo background image LBI adjacent to the logo image LI. However, the blurring area BA does not correspond to the entire logo area LA. That is, the area of the blurring area BA may be smaller than that of the logo area LA.

In some example embodiments, luminance may be gradually decreased when approaching the outside of the blurring area BA. Accordingly, the luminance of the logo image LI is decreased, and thus pixel degradation and occurrence of an afterimage can be minimized or reduced.

In some example embodiments, the position of the blurring area BA may be equal to that of the logo image LI. Image blurring may be performed on only the logo image LI.

In some example embodiments, the blurring determiner 140 may include a logo map calculator for calculating a binary-coded logo map that distinguishes the logo image LI and the logo background image LBI, a preliminary corrector for calculating a preliminary blurring map including blurring candidate values generated by averaging binary data of pixels included in the logo map, and a blurring area determiner for determining a blurring area BA of the logo image LI by comparing each of the blurring candidate values included in the preliminary blurring map and a preset blurring threshold value. The function, configuration, and operation of the blurring determiner 140 will be described in more detail below with reference to FIGS. 4 to 8C.

The image corrector 160 may blur the logo image LI, based on the determined blurring area BA. The image corrector 160 may correct input image data DATA of pixels corresponding to the blurring area BA to blurring image data BDATA.

The image corrector 160 may blur input image data IDATA of a target pixel, using a mask having a preset size. The target pixel exists at the center of the mask. For example, the size of the mask may be variously set, such as a 3×3 mask, a 5×5 mask, and a 7×7 mask.

In some example embodiments, the image corrector 160 may acquire averaged image data of the target pixel as the blurring image data BDATA by calculating an average of the input image data IDATA of the target pixel and input image data IDATA of pixels at the periphery of the target pixel, which correspond to the mask.

However, this is merely illustrative, and the method for blurring the image data is not limited thereto. The blurring of the image data may be replaced with various blurring methods known in the art.

For example, a middle value of the input image data included in the mask may be determined as the blurring image data BDATA of the target pixel. Alternatively, the blurring image data BDATA of the target pixel may be determined using a Gaussian mask.

Accordingly, the image blurring can be performed in only the blurring area BA within the logo area LA. Thus, an image change caused by the image blurring is not recognized by a user, and degradation of the pixels displaying the logo image LI and occurrence of an afterimage can be considerably minimized or reduced.

Figure 4:
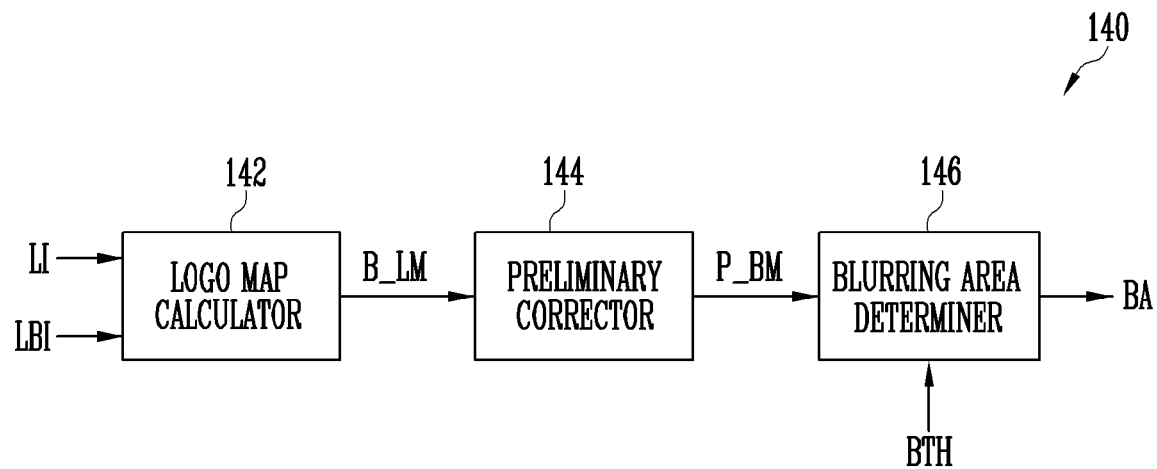
FIG. 4 is a block diagram illustrating an example of a blurring determiner included in the afterimage compensator of FIG. 2.

FIG. 4 is a block diagram illustrating an example of the blurring determiner included in the afterimage compensator of FIG. 2. FIGS. 5 to 8C are diagrams illustrating examples of an operation of the blurring determiner of FIG. 4.

Referring to FIGS. 2 to 8C, the blurring determiner 140 may include a logo map calculator 142, a preliminary corrector 144, and a blurring area determiner 146.

The logo map calculator 142 may calculate a binary-coded logo map B_LM that distinguishes the logo image LI and the logo background image LBI. In some example embodiments, the logo map B_LM may be calculated with respect to pixels P corresponding to the logo area LA. For example, when 100 pixels P are included in the logo area LA, the logo map B_LM may include information on the 100 pixels P of the logo area LA.

Figure 5:
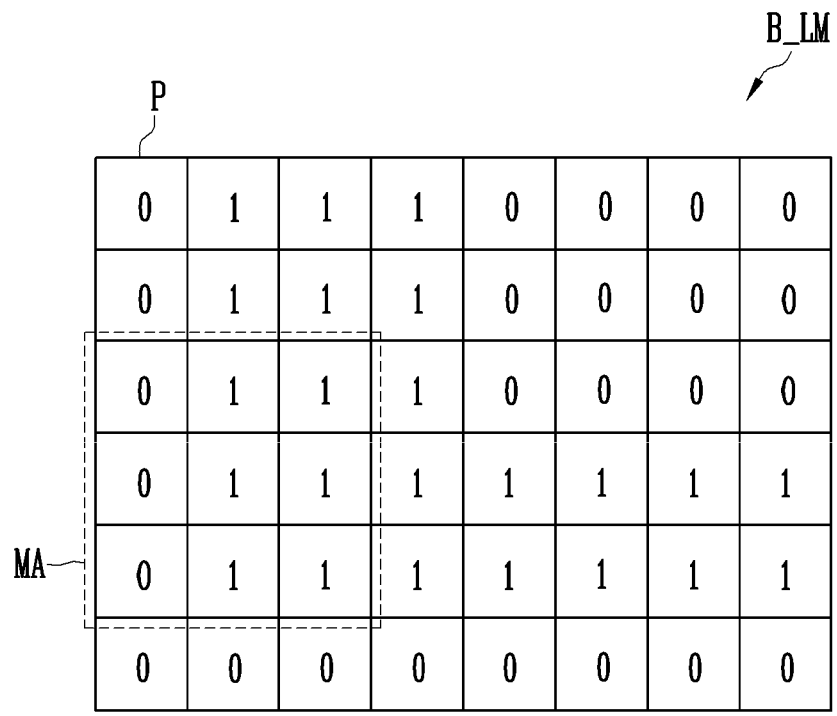
FIGS. 5 to 8C are diagrams illustrating examples of an operation of the blurring determiner of FIG. 4.

Information on one of the logo image LI and the logo background image LBI is included in each of the pixels P included in the logo map B_LM. For example, a pixel P corresponding to the logo image LI may be determined as 1, and a pixel P corresponding to the logo background image LBI may be determined as 0. As shown in FIG. 5, the logo map B_LM may be calculated as a combination of binary data.

The preliminary corrector 144 may calculate a preliminary blurring map P_BM including blurring candidate values PBV by averaging binary data of the pixels P included in the logo map B_LM.

In some example embodiments, the preliminary corrector 144 may calculate the preliminary blurring map P_BM, using an average filtering method. For example, the preliminary corrector 144 may calculate a blurring candidate value PBV of a target pixel TP, using a mask MA having a preset size. For example, the preliminary corrector 144 may acquire averaged data of the target pixel TP by calculating an average of binary data of the target pixel TP corresponding to the mask MA and binary data of peripheral pixels P of the target pixel TP included in the mask MA. The averaged data of the target pixel TP may be the blurring candidate value PBV.

Figure 6A:
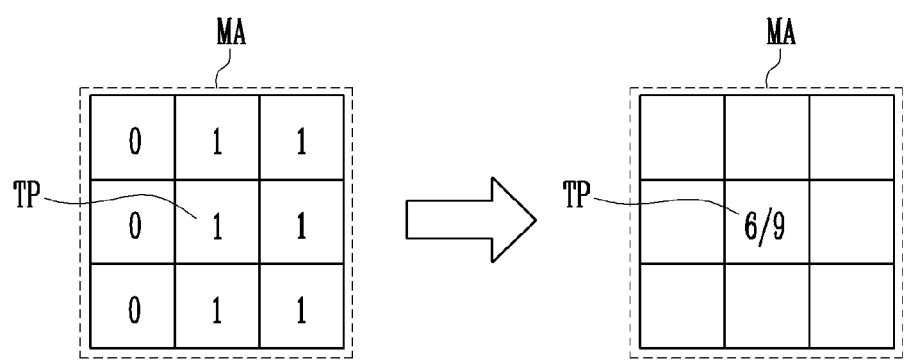

As shown in FIG. 6A, the mask MA may be a 3×3 mask. The blurring candidate value PBV of the target pixel TP may be average data of binary data of 9 pixels P included in the mask MA. The blurring candidate value PBV of the target pixel TP may be 6/9.

In some example embodiments, a preset weighted value may be additionally applied to the binary data or averaged data. That is, the averaged data having a value smaller than 1 is scaled, so that the blurring area BA can be easily calculated. For example, the binary data included in the logo map B_LM or the averaged data may be multiplied by 255. The 255 is a value selected to correspond to an 8-bit grayscale determined when the display device is designed. Accordingly, the blurring candidate value PBV of FIG. 6A may be determined as 500/3.

Figure 6B:
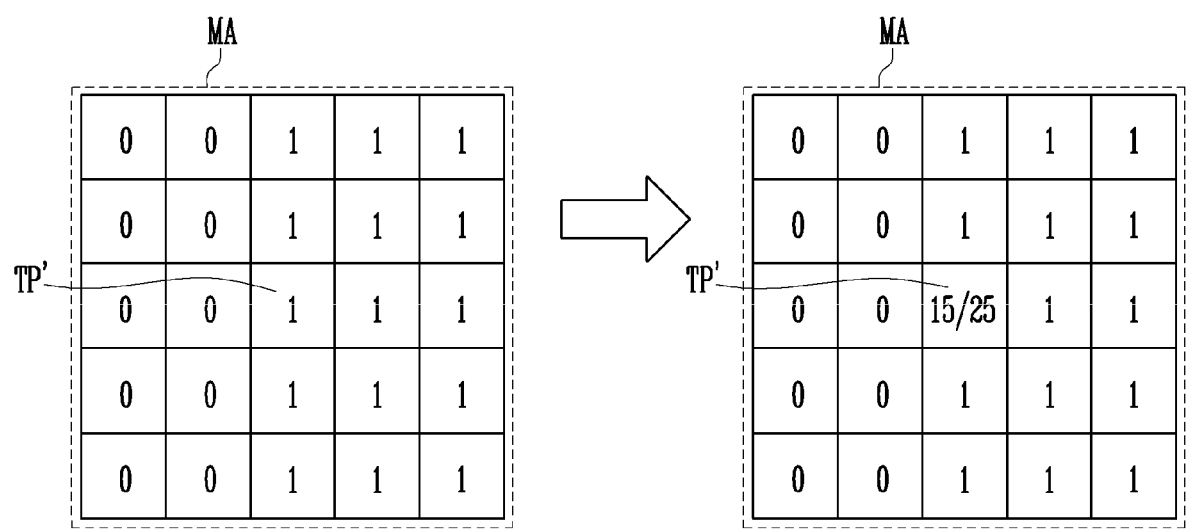

As shown in FIG. 6B, the mask MA may be a 5×5 mask. The blurring candidate value PBV of the target pixel TP may be average data of binary data of 25 pixels P included in the mask MA. The blurring candidate value PBV of the target pixel TP may be 15/25.

However, this is merely illustrative, and the size and shape of the mask MA are not limited thereto.

Figure 7:
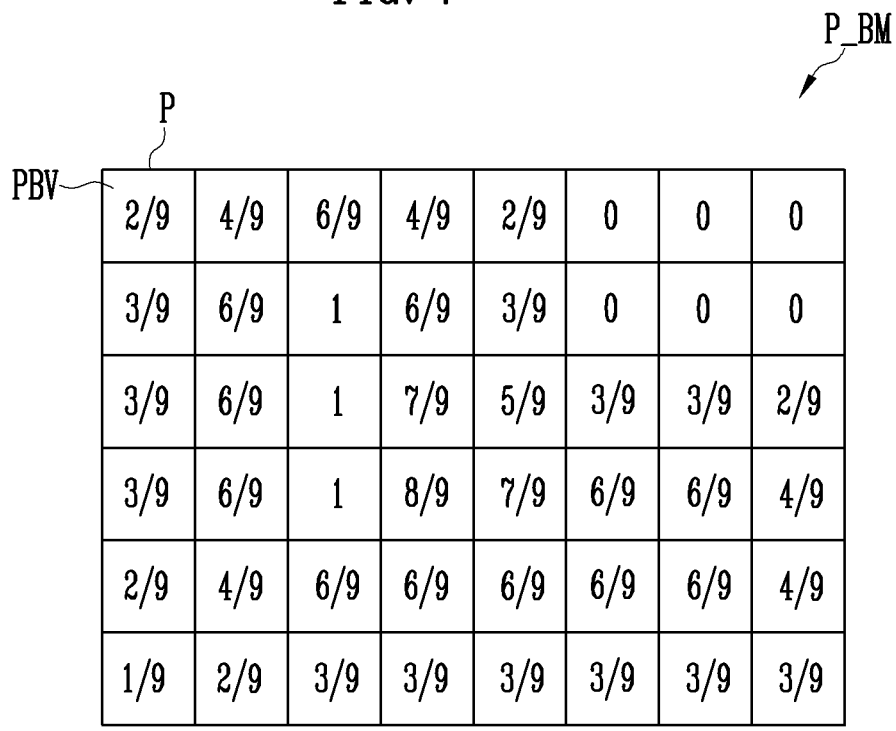

The mask MA may be applied to the entire logo area LA, and a blurring candidate value PBV of each of the pixels P included in the logo area LA. That is, as shown in FIG. 7, a preliminary blurring map P_BM including blurring candidate values PBV of pixels P may be calculated with respect to the logo map B_LM. In an embodiment, the above-described weighted value may be additionally applied to each of blurring weighted values included in the preliminary blurring map P_BM.

An area having a value larger than 0 in the preliminary blurring map P_BM may be formed larger than that having 1 in the logo map B_LM. It will be understood that the preliminary blurring map P_BM calculates candidates of pixels P on which blurring is to be performed. That is, the preliminary corrector 144 may determine candidates of pixels P on which blurring is to be performed. For example, pixels P having 0 in the preliminary blurring map P_BM are excluded in a subsequent blurring process.

The blurring area determiner 146 may determine a blurring area BA of the logo image LI by comparing each of averaged data included in the preliminary blurring map P_BM and a preset blurring threshold value BTH.

Figure 8A:
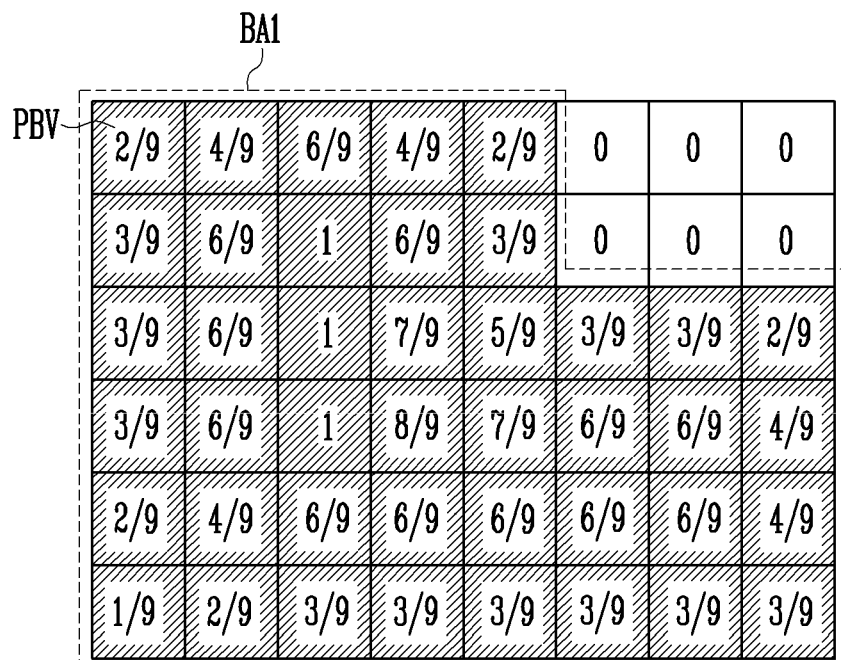

FIGS. 8A to 8C illustrate blurring areas BA respectively determined when the blurring threshold value BTH becomes 0, 2/9, and 3/9. In some example embodiments, the size of the blurring area BA including the logo image LI may be changed depending on the blurring threshold value BTH. That is, the size, shape, and boundary of the blurring area BA may be determined by the blurring threshold value BTH. For example, when the blurring threshold value BTH increases, the blurring area BA may be reduced and come close to the shape of the logo image LI. In other words, when the blurring threshold value BTH decreases, the blurring area and blurring effect of the logo image LI may be increased.

In some example embodiments, the blurring area BA may include the logo image LI and a portion of the logo background image LBI adjacent to the logo image LI. As shown in FIG. 8A, when the blurring threshold value BTH is 0, pixels of which blurring candidate value PBV has a value larger than 0 may be selected as a blurring area BA1. The blurring area BA1 is largest when the blurring threshold value BTH is 0.

As shown in FIG. B, when the blurring threshold value BTH is 2/9, pixels of which blurring candidate value PVB has a value larger than 2/9 may be selected as a blurring area BA2. The blurring area BA2 is smaller than the blurring area BA1.

In some example embodiments, the position of the blurring area BA may be equal to that of the logo image LI. As shown in FIG. 8C, when the blurring threshold value BTH is 3/9, pixels of which blurring candidate value PBV has a value larger than 3/9 may be selected as a blurring area BA3. The blurring area BA3 is almost similar to the logo map B_LM. Distortion of the logo background image LBI at the periphery of the logo image LI is substantially removed. That is, only the logo image LI is blurred, and a clear image can be displayed at the periphery of the logo image LI.

When the blurring threshold value BTH is larger than 3/9, the blurring area BA may be smaller than the logo map B_LM. Therefore, an afterimage compensation effect is reduced, and hence the blurring threshold value BTH is to be determined such that the blurring area BA is not smaller than the logo map B_LM.

In some example embodiments, a weighted value (e.g., a predetermined weighted value) may be applied to the blurring candidate value PBV. The blurring area BA may be determined by comparing the blurring candidate value PBV to which the weighted value is applied and the blurring threshold value BTH. The weighted value may facilitate average calculation and comparison by scaling data values smaller than 1.

Accordingly, an optimum blurring area BA can be determined with respect to the logo image LI.

Figure 9:
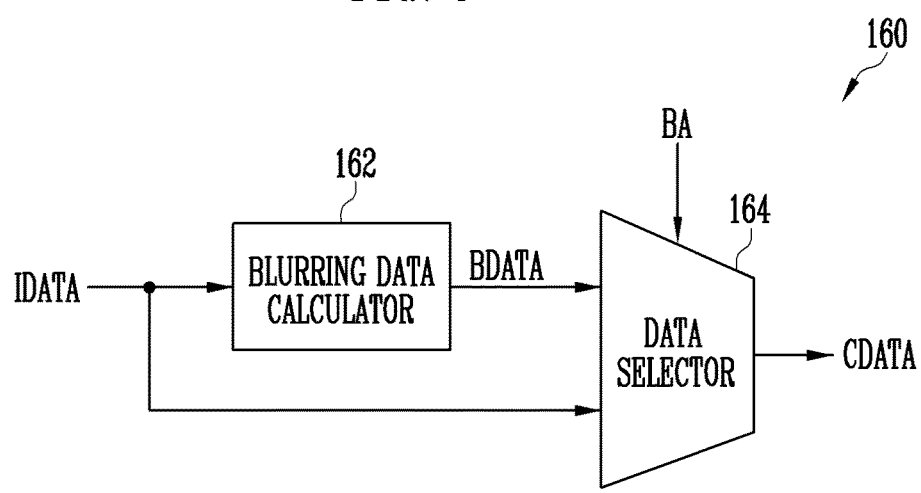
FIG. 9 is a block diagram illustrating an example of an image corrector included in the afterimage compensator of FIG. 2.
Figure 10:
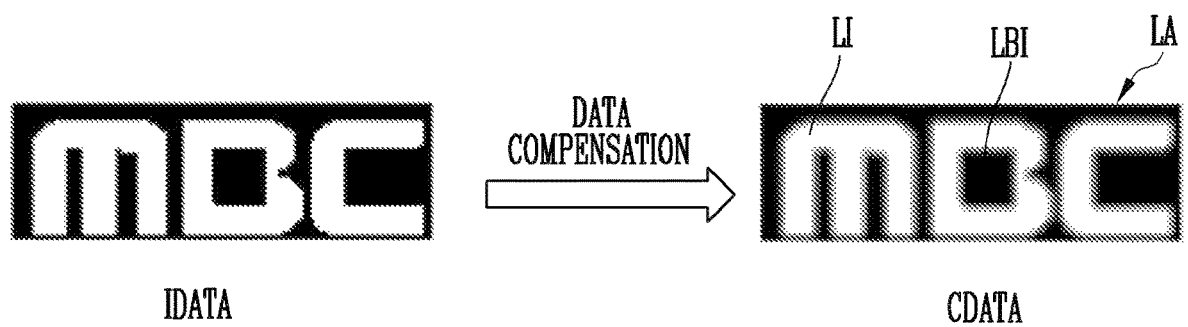
FIG. 10 is a diagram illustrating an example in which a logo image is displayed in a state in which it is blurred.

FIG. 9 is a block diagram illustrating an example of the image corrector included in the afterimage compensator of FIG. 2. FIG. 10 is a diagram illustrating an example in which a logo image is displayed in a state in which it is blurred.

Referring to FIGS. 2, 3, 9, and 10, the image corrector 160 may include a blurring data calculator 162 and a data selector 164.

The image corrector 160 may blur a logo image LI, based on a blurring area BA. The image corrector 160 may blur input image data of pixels corresponding to the blurring area BA.

The blurring data calculator 162 may convert input image data IDATA of a logo area LA respectively into blurring image data BDATA. In some example embodiments, the blurring data calculator 162 may convert input image data ODATA of all pixels included in the logo area LA into the blurring image data BDATA.

The blurring data calculator 162 may acquire averaged image data of the target pixel TP of FIG. 6A as the blurring image data BDATA by calculating an average of input image data IDATA of the target pixel TP and input image data IDATA of preset peripheral pixels of the target pixel TP. For example, the input image data IDATA used to calculate the average may be determined by the mask MA of FIG. 6A. In some example embodiments, the blurring image data BDATA may be acquired using the average data calculation method described with reference to FIGS. 6A and 6B.

For example, the average of the input image data IDATA may be a grayscale value average or luminance average of input image data IDATA of pixels included in a 3×3 mask. That is, the blurring image data of the target pixel TP may correspond to a grayscale value average or luminance average of pixels included in the mask MA, based on the target pixel TP.

In this manner, blurring image data BDATA of each of the pixels included in the logo area LA may be generated.

However, this is merely illustrative, and the method for calculating the blurring image data BDATA is not limited thereto. For example, a middle value of the input image data IDATA included in the mask MA may be determined as the blurring image data BDATA of the target pixel TP. Alternatively, the blurring image data BDATA of the target pixel TP may be determined using a Gaussian mask.

The data selector 164 may select blurring image data BDATA with respect to a pixel included in the blurring BA, and select input image data IDATA included in an area except the blurring area BA.

Blurring image data BDATA and input image data IDATA may be provided to the data selector 164. The data selector 164 may be provided with a blurring area BA from the blurring determiner 140.

The data selector 164 may select one of blurring image data BDATA and input image data IDATA corresponding to the target pixel, and output the selected data as compensated image data CDATA.

The data selector 164 may perform the image data selecting operation on all the pixels of the logo area LA.

The compensated image data CDATA output from the data selector 164 may be supplied to the data driver 40 of FIG. 1. The data driver 40 may supply a data signal corresponding to the compensated image data CDATA to the pixels.

However, this is merely illustrative, and the method for determining the blurring image data BDATA or the compensated image data CDATA is not limited thereto.

For example, the image corrector 160 may blur only the input image data DATA of the pixels included in the blurring area BA.

An image corresponding to the blurring area BA may be blurred. As shown in FIG. 10, the whole of a logo area LA is not blurred, and only a logo image LI may be blurred, or only the logo image LI and a portion of a logo background image LBI adjacent to the logo image LI may be blurred. In some example embodiments, luminance may be gradually decreased when approaching the outside of the blurring area BA.

As described above, in the afterimage compensator 100 and the display device 1 having the same according to some example embodiments of the present disclosure, image blurring may be performed in only the blurring area BA within the logo area LA. Accordingly, although the logo image LI is blurred, the logo background image LBI at the periphery of the logo image LI can be relatively clearly displayed without loss of the luminance and grayscale of an original image. Thus, any change such as image distortion caused by blurring is not recognized by a user, and degradation of pixels that display the logo image LI and occurrence of an afterimage can be considerably minimized or reduced.

FIG. 11 is a flowchart illustrating a method for driving the display device according to some example embodiments of the present disclosure.

Referring to FIG. 11, the method may include detecting a logo image (S100), calculating a binary-coded logo map (S200), calculating a preliminary blurring map (S300), comparing a blurring candidate value and a blurring threshold value (S400), and displaying an image (S600), based on the comparison result (i.e., S500 and S550). When the blurring candidate value exceeds the blurring threshold value, input image data of a corresponding pixel may be blurred (S500).

A logo area including a logo image and a logo background image included in a preset range at the periphery of the logo image may be detected based on input image data (S100). The detection of the logo area may be performed by an artificial intelligence program that performs machine learning for detecting the logo image.

A binary-coded logo map that distinguishes the logo image and the logo background image may be calculated (S200). The logo area and the logo image are relatively accurately detected by the artificial intelligence program, and thus the binary-coded logo map having very high reliability can be derived.

A preliminary blurring map including blurring candidate values may be calculated by averaging binary data of pixels included in the logo map (S300). In some example embodiments, the preliminary blurring map may be calculated using an average filtering method using a predetermined mask.

Each of the blurring candidate values included in the preliminary blurring map and a preset blurring threshold value may be compared (S400).

When a blurring candidate value of a target pixel exceeds the blurring threshold value, the target pixel may be determined as a blurring area. Input image data corresponding to the blurring area may be blurred (S500).

When the blurring candidate value of the target pixel is the blurring threshold value or less, input image data of the target pixel may be output as it is (S550).

An image of the logo area may be displayed corresponding to the blurred image data and the input image data (S600).

Detailed operations of S100 to S600 have been described with reference to FIGS. 2 to 10, and therefore, some repetitive or overlapping descriptions will be omitted.

As described above, in the method for driving the display device according to some example embodiments of the present disclosure, image blurring may be performed in only the blurring area within the logo area. Accordingly, although the logo image is blurred, the logo background image at the periphery of the logo image can be relatively clearly displayed without loss of the luminance and grayscale of an original image. Thus, any change such as image distortion caused by blurring is not recognized by a user, and degradation of pixels that display the logo image and occurrence of an afterimage can be considerably minimized or reduced.

The present disclosure can be applied to an arbitrary electronic device including a display device. For example, the present disclosure can be applied to HMD devices, TVs, digital TVs, 3D TVs, PCs, home appliances, notebook computers, tablet computers, mobile phones, smart phones, PDAs, PMPs, digital cameras, music players, portable game consoles, navigation systems, and the like. Also, the present disclosure can be applied to wearable devices such as smart watches.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Aspects of some example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, and their equivalents.

What is claimed is:

1. An afterimage compensator comprising:
    a logo detector configured to detect a logo area including a logo image and a logo background image at a periphery of the logo image, based on input image data;
    a blurring determiner configured to determine a blurring area including the logo image and a portion of the logo background image adjacent to the logo image, based on a preliminary blurring map; and an image corrector configured to blur the input image data of pixels included in the blurring area, except input image data of pixels outside the blurring area, wherein the blurring determiner calculates a logo map including binary values, based on the logo image and the logo background image, and then calculates the preliminary blurring map including blurring candidate values of binary values and non-binary values, based on the logo map, and wherein the blurring area is smaller than the preliminary blurring map such that the blurring area includes pixels of which the blurring candidate values are larger than a preset blurring threshold value establishing a threshold value for blurring the logo image.

2. The afterimage compensator of claim 1, wherein luminance is gradually decreased when approaching the outside of the blurring area.

3. The afterimage compensator of claim 1, wherein the blurring determiner includes:
   a logo map calculator configured to calculate the logo map that distinguishes the logo image and the logo background image;
   a preliminary corrector configured to calculate the preliminary blurring map having blurring candidate values by averaging binary data of pixels included in the logo map; and
   a blurring area determiner configured to determine a blurring area of the logo image by comparing each of the blurring candidate values included in the preliminary blurring map and the preset blurring threshold value.

4. The afterimage compensator of claim 3, wherein the preliminary corrector is configured to acquire a blurring candidate value of a target pixel by calculating an average of the binary data of the target pixel and the binary data of preset peripheral pixels of the target pixel.

5. The afterimage compensator of claim 4, wherein a preset weighted value is applied to the binary data or the blurring candidate value.

6. The afterimage compensator of claim 3, wherein a size of the blurring area including the logo image is changed depending on the preset blurring threshold value.

7. The afterimage compensator of claim 3, wherein the image corrector is configured to acquire averaged image data of a target pixel as blurring image data by calculating an average of the input image data of the target pixel and the input image data of preset peripheral pixels of the target pixel.

8. The afterimage compensator of claim 3, wherein the image corrector includes:
   a blurring data calculator configured to convert the input image data of the logo area respectively into blurring image data; and
   a data selector configured to select the blurring image data with respect to a pixel included in the blurring area, and select the input image data with respect to a pixel included in an area except the blurring area.

9. The afterimage compensator of claim 1, wherein the logo detector includes an artificial intelligence program that performs machine learning for detecting the logo image.

10. A display device comprising:
    a display panel including a plurality of pixels configured to display an image;
    an afterimage compensator configured to detect a logo image and generate blurring image data for blurring the logo image;
    a scan driver configured to provide a scan signal to the display panel; and
    a data driver configured to provide the display panel with a data signal corresponding to the blurring image data and input image data,
    wherein the afterimage compensator includes:
    a logo detector configured to detect a logo area including the logo image and a logo background image at a periphery of the logo image, based on the input image data;
    a blurring determiner configured to determine a blurring area including the logo image and a portion of the logo background image adjacent to the logo image, based on a preliminary blurring map; and
    an image corrector configured to blur input image data of pixels included in the blurring area, except input image data of pixels outside the blurring area,
    wherein the blurring determiner calculates a logo map including binary values, based on the logo image and the logo background image, and then calculates the preliminary blurring map including blurring candidate values of binary values and non-binary values, based on the logo map, and
    wherein the blurring area is smaller than the preliminary blurring map such that the blurring area includes pixels of which the blurring candidate values are larger than a preset blurring threshold value establishing a threshold value for blurring the logo image.

11. The display device of claim 10, wherein luminance is gradually decreased when approaching the outside of the blurring area.

12. A method for driving a display device, the method comprising:
    detecting a logo area including a logo image and a logo background image at a periphery of the logo image, based on input image data;
    calculating a binary-coded logo map that distinguishes the logo image and the logo background image;
    calculating a preliminary blurring map having blurring candidate values by averaging binary data of pixels included in the logo map, the preliminary blurring map including both binary values and non-binary values;
    determining a blurring area of the logo image by comparing each of the blurring candidate values included in the preliminary blurring map and a preset blurring threshold value, wherein the blurring area is smaller than the preliminary blurring map such that the blurring area includes pixels of which the blurring candidate values are larger than the preset blurring threshold value establishing a threshold value for blurring the logo image; and
    blurring input image data of pixels included in the blurring area, except input image data of pixels outside the blurring area.

* * * * *